(12) United States Patent
Hall et al.

(10) Patent No.: US 12,173,597 B2
(45) Date of Patent: Dec. 24, 2024

(54) METHODS FOR COMPLETING HYDROCARBON WELLS USING VARIABLE RATE FRACTURING

(71) Applicant: ExxonMobil Technology and Engineering Company, Spring, TX (US)

(72) Inventors: Lee J. Hall, The Woodlands, TX (US); Dragan Stojkovic, Spring, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 93 days.

(21) Appl. No.: 18/045,994

(22) Filed: Oct. 12, 2022

(65) Prior Publication Data

US 2023/0119075 A1 Apr. 20, 2023

Related U.S. Application Data

(60) Provisional application No. 63/262,756, filed on Oct. 20, 2021.

(51) Int. Cl.
*E21B 43/267* (2006.01)
*C09K 8/80* (2006.01)
*E21B 43/119* (2006.01)

(52) U.S. Cl.
CPC .............. *E21B 43/267* (2013.01); *C09K 8/80* (2013.01); *E21B 43/119* (2013.01)

(58) Field of Classification Search
CPC ........ E21B 43/267; E21B 43/119; C09K 8/80
See application file for complete search history.

(56) References Cited

U.S. PATENT DOCUMENTS

| | | | | |
|---|---|---|---|---|
| 3,700,032 A | * | 10/1972 | Terry | ...................... E21B 43/26 166/308.1 |
| 2009/0038797 A1 | * | 2/2009 | Skala | ....................... C09K 8/80 507/239 |
| 2011/0127038 A1 | * | 6/2011 | Mack | .................... E21B 43/267 166/308.1 |

* cited by examiner

*Primary Examiner* — Dany E Akakpo
(74) *Attorney, Agent, or Firm* — ExxonMobil Technology and Engineering Company—Law Department

(57) ABSTRACT

Methods for completing hydrocarbon wells using variable rate fracturing are provided herein. One method includes positioning a perforation device within a tubular conduit of a downhole tubular, where the downhole tubular extends within a wellbore, and where the wellbore extends within a subsurface region, as well as perforating the downhole tubular using the perforation device to define perforations within the downhole tubular. The method also includes pumping a slurry including fracturing fluid and a lightweight proppant into the tubular conduit according to a variable pumping rate schedule to fracture zones of the subsurface region that are proximate to the perforations, forming corresponding fractures within the subsurface region. The method further includes flowing the slurry into the fractures, via the perforations, to prop the fractures with the lightweight proppant, where the lightweight proppant includes granules formed from a polyolefin, petroleum coke, and/or a polyaromatic hydrocarbon resin.

19 Claims, 2 Drawing Sheets

METHODS FOR COMPLETING HYDROCARBON WELLS USING VARIABLE RATE FRACTURING

CROSS-REFERENCE TO RELATED APPLICATION

This application claims the benefit of U.S. Provisional Application 63/262,756, entitled "A Methods for Completing Hydrocarbon Wells Using Variable Rate Fracturing," filed Oct. 20, 2021, the disclosure of which is hereby incorporated by reference in its entirety.

FIELD OF THE INVENTION

The techniques described herein relate to the field of hydrocarbon well completions and hydraulic fracturing operations. More specifically, the techniques described herein relate to methods for completing hydrocarbon wells using variable rate fracturing.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

A wellbore is drilled into a subterranean formation to promote removal (or production) of a hydrocarbon resource therefrom. In many cases, the subterranean formation needs to be stimulated in some manner to promote removal of the hydrocarbon resource. Stimulation operations include any operation performed upon the matrix of a subterranean formation to improve hydraulic conductivity therethrough, including hydraulic fracturing, which is a common stimulation operation for unconventional reservoirs.

Hydraulic fracturing operations involve the pumping of large quantities of fracturing fluid into a subterranean formation (e.g., a low-permeability formation) under high hydraulic pressure to promote the formation of one or more fractures within the matrix of the subterranean formation and to create high-conductivity flow paths. Moreover, as the fracturing fluid is pumped into the formation, primary fractures extending from the wellbore and, in some instances, secondary fractures extending from the primary fractures, are formed. These fractures generally follow the direction of maximum horizontal stress with deviations caused by rock inhomogeneity, and more rarely, due to the presence of uncemented natural fractures.

Once the fracturing fluid has created the fractures within the subterranean formation, a proppant is typically pumped into the fractures to "prop" the fractures open after the hydraulic pressure has been released following the hydraulic fracturing operation. Specifically, upon reaching the fractures, the proppant settles therein to form a proppant pack that prevents the fractures from closing once the hydraulic pressure has been released. In this manner, the proppant provides a long-term increase in fluid permeability within the near-wellbore region of the formation.

In operation, the success of the hydraulic fracturing process has a direct impact on the amount of hydrocarbon fluids that may be recovered from the reservoir. Specifically, the numbers, sizes (e.g., lengths, heights, and/or aperture sizes), compliances, and locations of the fractures corresponding to the perforation clusters within each stage of the hydrocarbon well directly impact the amount of hydrocarbon fluids that are able to mobilize and flow into the hydrocarbon well. Ideally, each perforation cluster within a particular stage leads to a single long, complex fracture, thus maximizing the propped fracture surface area using a given amount of resources in terms of pumping horsepower and fracturing fluid materials, including proppant. However, in reality, many perforation clusters do not open during the fracturing process, and some perforation clusters open only partially, resulting in the generation of small, inefficient fractures.

As a result, specialized methods have been developed to maximize the number of fractures formed during hydraulic fracturing operations, as well as the sizes and complexities of the resulting fractures. In particular, variable rate fracturing techniques have been proposed to increase the numbers, sizes, and complexities of the resulting fractures by rapidly changing the rate of pumping the fracturing fluid during the hydraulic fracturing process. For example, during variable rate fracturing, the pumping rate may be rapidly decreased from a predetermined maximum to a significantly lower pumping rate, and then rapidly increased back to the maximum pumping rate. This, in turn, results in the application of pressure, as well as shear and tensile stress, on the formation, thus opening previously unopened perforation clusters and increasing fracture sizes and/or complexities through the infiltration of additional fracturing fluid into such fractures.

However, such variable rate fracturing techniques do not account for the tendency of conventional proppants, such as sand and/or ceramics, to settle out within the fractures. In particular, because conventional proppants generally have densities that are significantly higher than that of the carrier fluid (i.e., the fracturing fluid), effective transport of the proppant within the formation is difficult due to such settling, especially when the rate is decreased during a variable rate pumping cycle. This, in turn, may limit the effective reach and/or depth to which the proppant can be utilized, making it challenging to distribute the proppant into more remote reaches of a network of fractures. In addition, fine-grained particles (referred to as "fines") produced from crushing of the sand proppant within the fractures can also lessen hydraulic conductivity, which may decrease production rates and/or necessitate wellbore cleanout operations. In general, such issues have proven to be a barrier to the broader adoption of variable rate fracturing techniques.

SUMMARY OF THE INVENTION

An embodiment described herein provides a method of completing a hydrocarbon well using variable rate fracturing. The method includes positioning a perforation device within a tubular conduit of a downhole tubular, where the downhole tubular extends within a wellbore, and where the wellbore extends within a subsurface region. The method includes perforating the downhole tubular using the perforation device to define a number of perforations within the downhole tubular. The method also includes pumping a slurry including a fracturing fluid and a lightweight proppant into the tubular conduit according to a variable pumping rate schedule to fracture a number of zones of the subsurface region that are proximate to the number of perforations, forming a number of corresponding fractures within the subsurface region. The method further includes flowing the slurry including the fracturing fluid and the lightweight proppant into at least a portion of the fractures, via the perforations, to prop the fractures with the lightweight proppant. For this method, the lightweight proppant includes a number of granules including a polyolefin, petroleum coke and/or a polyaromatic hydrocarbon resin, and a characteristic dimension of each granule is at least 10 micrometers and at most 3 millimeters.

Another embodiment described herein provides another method of completing a hydrocarbon well using variable rate fracturing, the method including hydraulically fracturing a subsurface region through which a wellbore extends by sequentially increasing and decreasing a pumping rate for pumping a slurry including a fracturing fluid and a lightweight proppant into the subsurface region via a tubular conduit of the wellbore. The sequential increase and decrease of the pumping rate, as well as the formulation of the lightweight proppant, are controlled such that settling of the lightweight proppant within a near-wellbore region of the subsurface region is minimized. In addition, for this method, the lightweight proppant includes a number of granules including a polyolefin, petroleum coke, and/or a polyaromatic hydrocarbon resin.

These and other features and attributes of the disclosed embodiments of the present disclosure and their advantageous applications and/or uses will be apparent from the detailed description which follows.

BRIEF DESCRIPTION OF THE DRAWINGS

To assist those of ordinary skill in the relevant art in making and using the subject matter thereof, reference is made to the appended drawings, wherein.

Figure 1:
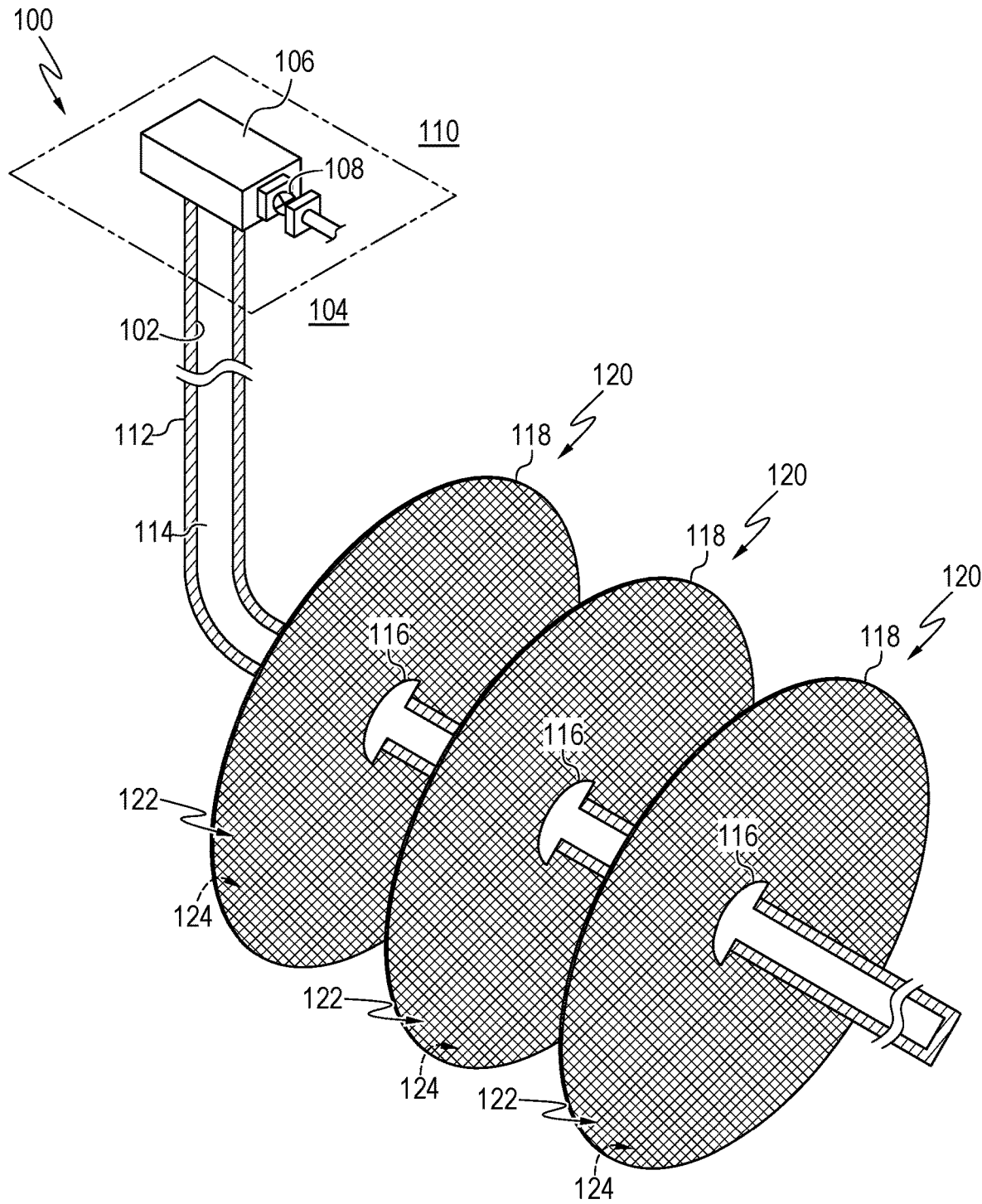
FIG. 1 is a schematic view of an exemplary hydrocarbon well that may be completed using variable rate fracturing techniques according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

Terminology

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particulates, refers to the density of the individual particulates themselves, which may be expressed in grams per cubic centimeter (g/cc). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The term "alkyl" refers to a hydrocarbyl group having no unsaturated carbon-carbon bonds, and which may be optionally substituted. The term "alkylene" refers to an alkyl group having at least two open valence positions.

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms. The term "diene" refers to an alkenyl group having two carbon-carbon double bonds.

The terms "aromatic" and "aromatic hydrocarbon" refer to a hydrocarbon or hydrocarbyl group having a cyclic arrangement of conjugated pi-electrons that satisfy the Hückel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms. The term "arylene" refers to an aryl group having at least two open valence positions.

Examples of saturated hydrocarbyl groups include, but are not limited to, methyl, ethyl, n-propyl, isopropyl, n-butyl, isobutyl, sec-butyl, tert-butyl, pentyl, isopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

Examples of aromatic hydrocarbyl groups include, but are not limited to, phenyl, tolyl, xylyl, naphthyl, and the like, including all possible isomeric forms thereof. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl hydrocarbyl groups may include, but are not limited to, naphthalene, anthracene, indane, indene, and tetralin.

Relatedly, the term "polyaromatic hydrocarbon" refers to a hydrocarbyl group bearing at least two aromatic rings, which may be fused or unfused. Optional heteroatom substitution may be present in at least one of the at least two aromatic rings.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A or B" (or, equivalently, "at least one of A and B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "based on" does not mean "based only on," unless expressly specified otherwise. In other words, the phrase "based on" means "based only on," "based at least on," and/or "based at least in part on".

As used herein, the term "crush strength," with reference to proppant particulates, refers to the stress load proppant particulates can withstand prior to crushing (e.g., breaking or cracking). The crush strength values provided herein are based on API RP-19C or ISO 13503-2.

As used herein, the term "delayed coke" refers to the solid concentrated carbon material that is produced within delayed coking units via the delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature of around 895° F. to around 960° F. The heated feedstock then enters a reactor, referred to as a "coke drum," which typically operates at temperatures of around 780° F. to around 840° F. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "flexicoke" refers to the solid concentrated carbon material produced from FLEXICOKING™ (trademark of ExxonMobil Research and Engineering Company ("ExxonMobil")). The term "FLEXICOKING™" refers to a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process in which the flexicoke integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and then cooled by cold coke from the reactor to provide a portion of the reactor heat requirement, which is typically about 496° C. to about 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct.

As used herein, the term "fluid" refers to gases and liquids, as well as to combinations of gases and liquids, combinations of gases and solids, combinations of liquids and solids, and combinations of gases, liquids, and solids.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing intervals, generally referred to as "reservoirs." Note that the terms "formation," "reservoir," and "interval" may be used interchangeably, but may generally be used to denote progressively smaller subsurface regions, stages, or volumes. More specifically, a "formation" may generally be the largest subsurface region, while a "reservoir" may generally be a hydrocarbon-bearing stage or interval within the geologic formation that includes a relatively high percentage of oil and gas. Moreover, an "interval" may generally be a sub-region or portion of a reservoir. In some cases, a hydrocarbon-bearing stage, or reservoir, may be separated from other hydrocarbon-bearing stages by stages of lower permeability, such as mudstones, shales, or shale-like (i.e., highly-compacted) sands.

The use of the noun "fracture" refers to a crack or surface of breakage induced by an applied pressure or stress within a subsurface formation. Moreover, the use of the noun "fracture network" refers to a group of closely-spaced, substantially-parallel fracture planes corresponding to a particular perforation cluster within a particular stage of a multi-stage hydrocarbon well.

The use of the verb "fracture" means to perform a stimulation treatment, such as a hydraulic fracturing treatment, which is routine for hydrocarbon wells in low-permeability reservoirs. Specially-engineered fracturing fluids are pumped at high pressures and rates into the reservoir interval to be treated, causing fractures to open. The wings of the fractures extend away from the wellbore in opposing directions according to the natural stresses within the formation. The characteristics of different fractures and fracture networks have a significant impact on a reservoir's production capability.

As used herein, the term "fracture conductivity" refers to the ability of a fluid to flow through a fracture at various stress (or pressure) levels, which is based, at least in part, on the permeability and thickness of the fracture. The fracture conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

The term "fracturing fluid" refers to a fluid injected into a hydrocarbon well as part of a stimulation operation. A commonly-used fracturing fluid is "slickwater." Slickwater is mostly water with a small amount, i.e., around 1%, of friction reducers and other fluids (usually shear thinning, non-Newtonian solutions, gels, or emulsions). The friction reducers and other fluids allow for a faster pumping rate into a reservoir, leading to an increase in the numbers and sizes of the fractures formed.

As used herein, the term "hydraulic conductivity" refers to the ability of a fluid within a formation to pass through a fracture including proppant at various stress (or pressure) levels, which is based, at least in part, on the permeability of the proppant deposited within the fractures.

The term "hydraulic fracturing" refers to a process for creating fractures that extend from a wellbore into a reservoir, so as to stimulate the flow of hydrocarbon fluids from the reservoir into the wellbore. A fracturing fluid is generally injected into the reservoir with sufficient pressure to create and extend multiple fractures within the reservoir, and a proppant material is used to "prop" or hold open the fractures after the hydraulic pressure used to generate the fractures has been released.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_6$, $C_3$ isomers, $C_4$ isomers, benzene, and the like.

The terms "hydrocarbyl" and "hydrocarbyl group" are used interchangeably herein. The term "hydrocarbyl group" refers to any C1-C100 hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, S(=O)2, NO2, F, Cl, Br, I, $NR_2$, OR, SeR, TeR, PR2, AsR2, SbR2, SR, BR2, SiR3, GeR3, SnR3, PbR3, where R is a hydrocarbyl group or H. Suitable hydrocarbyl groups may include alkyl, alkenyl, alkynyl, aryl, aralkyl, heteroaryl, cycloalkyl, heterocyclyl, and the like, any of which may be optionally substituted.

As used herein, the term "near-wellbore region," when used in reference to a formation (or subsurface region), refers to a region of the formation that is in proximity to the wellbore, particularly a region of the formation including at least a portion of the fractures that are hydraulically coupled to the wellbore and extending for any reasonable length or depth into such fractures.

The term "petroleum coke" (or simply "coke") refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as coke.

The term "polyolefin" refers to a group of polymers obtained from the polymerization of simple olefin monomer units. In general, polyolefins are categorized as a type of thermoplastic, and they are characterized by being stiff, light, and hard. As an example, polypropylene (PP) is a polyolefin that is obtained from the polymerization of propylene. As another example, polyethylene (PE) is a polyolefin that is obtained from the polymerization of ethylene. There are several sub-groups of PEs, including high-density polyethylene (HDPE), low-density polyethylene (LDPE), and linear low-density polyethylene (LLDPE). Moreover, PE is commonly formed into a wax, referred to as PE wax, which is an ultra-lower-molecular-weight PE consisting of ethylene monomer chains.

As used herein, the term "proppant" refers to any suitable material that is capable of maintaining open an induced fracture within a formation during and following a hydraulic fracturing treatment for a corresponding wellbore.

The terms "saturated" or "saturated hydrocarbon" refer to a hydrocarbon or hydrocarbyl group in which all carbon atoms are bonded to four other atoms or are bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms. More specifically, unsaturated carbon atoms may possess at least one carbon-carbon double bond and/or at least one carbon-carbon triple bond.

As used herein, the term "surface" refers to the uppermost land surface of a land well, or the mud line of an offshore well, while the term "subsurface" (or "subterranean") generally refers to a geologic strata occurring below the earth's surface. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing strings and other equipment that is located inside the wellbore. Moreover, according to embodiments described herein, the terms "downhole" and "subsurface" are sometimes used interchangeably, although the term "downhole" is generally used to refer specifically to the inside of the wellbore.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

As used herein, the term "variable rate fracturing" (also referred to as "variable rate hydraulic fracturing" or "variable rate pumping") refers to a hydraulic fracturing process in which the pumping rate for the fracturing fluid (or a slurry of the fracturing fluid and one or more proppant materials) is sequentially increased and decreased.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

As described above, conventional proppants tend to settle out into the formation during hydraulic fracturing operations, limiting the effective reach and/or depth to which such proppants can be utilized. Moreover, this issue has proven to be a barrier to the broader adoption of variable rate fracturing techniques. Accordingly, embodiments described herein provide methods for utilizing a low-cost, lightweight proppant to assist variable rate fracturing techniques. Such methods include hydraulically fracturing a formation through which a wellbore extends by sequentially increasing and decreasing a pumping rate for pumping a slurry including a fracturing fluid and a lightweight proppant (and, optionally, some amount of conventional proppant and/or other suitable type(s) of proppant) into the formation via a tubular conduit of the wellbore. In various embodiments, the sequential increase and decrease of the pumping rate, as well as the specific formulation of the lightweight proppant, are specifically analyzed and controlled such that settling of the lightweight proppant within a near-wellbore region of the formation is minimized. Moreover, as described herein, the utilized lightweight proppant is formed from a number of granules including one or more polyolefins, one or more petroleum coke materials, and/or one or more polyaromatic hydrocarbon resins. As described herein, utilizing such a lightweight proppant enables the proppant to stay suspended for a relatively long period of time during the variable rate fracturing process, thus increasing the overall propping potential for the process and extending the effective reach and/or depth for depositing the proppant within the resulting fractures.

Exemplary Hydrocarbon Well that May be Completed Using Variable Rate Fracturing Techniques FIG. 1 is a schematic view of an exemplary hydrocarbon well 100 that may be completed using variable rate fracturing techniques according to embodiments described herein. The exemplary hydrocarbon well 100 includes a wellbore 102 that extends within a subsurface region 104 including a hydrocarbon-bearing formation or reservoir, as well as a wellhead 106 including (among other components) a shut-in valve 108 that controls the flow of hydrocarbon fluids from the subsurface region 104 to a surface region 110. The hydrocarbon well 100 also includes a downhole tubular 112 that extends within the wellbore 102 and defines a tubular conduit 114 that provides a flow path for the hydrocarbons fluid to flow from the subsurface region 104 to the surface region 110. The downhole tubular 112 includes a number of perforations 116 and a number of fractures 118 formed within a number of zones (or stages) 120 corresponding to the subsurface region 104. As described herein, each fracture 118 may be formed responsive to flow of a fracturing fluid (or a slurry of fracturing fluid and proppant) through a corresponding perforation 116. As such, each fracture 118 may be proximate to (and/or associated with) the corresponding perforation 116.

According to embodiments described herein, the hydrocarbon well 100 further includes a lightweight (or low-density) proppant 122 positioned within the fractures 118 (or at least a portion thereof). The lightweight proppant 122 may include, for example, one or more polyolefins, one or more petroleum coke materials, one or more polyaromatic hydrocarbon resins, one or more polyolefin-coke composite materials, one or more polymer-coated polyolefins, one or more polymer-coated petroleum coke materials, one or more polymer-coated polyolefin-coke composite materials, one or more polymer-coated polyaromatic hydrocarbon resins, or any combinations thereof. For embodiments in which polyolefin(s) and/or polyolefin-coke composite material(s) are utilized, at least some proportion of the granules of the lightweight proppant include and/or contain a number of polyolefin polymer chains, such as, for example, PP, PE (e.g., HDPE), a blend of PP and PE, PE wax, or any combination thereof. For embodiments in which petroleum coke material(s) and/or polyolefin-coke composite material (s) are utilized, at least some proportion of the granules of the lightweight proppant may include and/or contain fluid coke, flexicoke, pulverized delayed coke, or any combinations thereof. In addition, for embodiments in which polyaromatic hydrocarbon resins are utilized, at least some proportion of the granules of the lightweight proppant may include and/or contain a substantially-spherical crosslinked reaction product of one or more polyaromatic hydrocarbons and a crosslinking agent, where the crosslinking agent includes two or more functional groups that are reactive under acid-catalyzed conditions with aromatic rings of the polyaromatic hydrocarbon(s). Moreover, for embodiments in which the granules of the lightweight proppant are coated with one or more polymers, such polymer(s) may include, for example, epoxy, methacrylate, polyester, vinyl ester, furan, furfural, alcohol-furfural, polyurethane, urea-aldehyde, phenol-aldehyde, or any combinations thereof. In general, the specific formulation of the granules within the lightweight proppant 122 may be specifically selected based on the particular subsurface conditions and fluid parameters.

Moreover, in some embodiments, one or more of the fractures 118 include a conventional proppant 124 positioned therein, in addition (or alternatively) to the lightweight proppant 122 described herein. Examples of suitable conventional proppants include sand, bauxite, and/or ceramic granules or particles. In various embodiments, the density of the conventional proppant 124 is greater than the density of the lightweight proppant 122. For example, in various embodiments, the density of the conventional proppant 124 is in a range between about 2.6 grams per cubic centimeter (g/cc) to about 3.5 g/cc, while the density of the lightweight proppant 122 is in a range between about 0.8 g/cc to about 1.6 g/cc. Accordingly, in various embodiments, the density of the conventional proppant 124 is at least about 1.5 to about 4.5 times greater than the density of the lightweight proppant 122 described herein.

In some embodiments, the conventional proppant 124 and the lightweight proppant 122 are both positioned within each fracture 118. Stated another way, each fracture 118 may include both the conventional proppant 124 and the lightweight proppant 122. For example, in some embodiments, the conventional proppant 124 and the lightweight proppant 122 are uniformly distributed throughout the fractures 118. As another example, in some embodiments, the conventional proppant 124 is preferentially positioned within a first portion (or subset) of the fractures 118, while the lightweight proppant 122 is preferentially positioned within a second portion (or subset) of the fractures 118. This positioning of the conventional proppant 124 and the lightweight proppant 122 may be passively created, for example, as a result of the difference in density between the two proppants 122 and 124. As a more specific example, the lightweight proppant 122 may be preferentially positioned within relatively shallower regions of the subsurface region 104 and/or within fractures 118 that are associated with relatively shallower layers, while the conventional proppant 124 may be preferentially positioned within relatively deeper regions of the subsurface region 104 and/or within fractures 118 that are associated with relatively deeper layers.

Additionally or alternatively, this preferential positioning of the conventional proppant 124 and the lightweight proppant 122 may be actively and/or purposefully created. As an example, during completion of the hydrocarbon well 100, the proppants 122 and 124 may be provided to the wellbore 102 and/or flowed into the fractures 118 such that the conventional proppant 124 is preferentially positioned within the first portion of the fractures 118 and the lightweight proppant 122 is preferentially positioned within the second portion of the fractures 118.

According to embodiments described herein, variable rate fracturing techniques are utilized to fracture the subsurface region 104 using the lightweight proppant 122 (and, optionally, the conventional proppant 124), as well as to provide for better placement of the proppants 122 and 124 within the resulting fractures 118. In various embodiments, this is accomplished by pumping the lightweight proppant 122 into the wellbore 102 (optionally in combination with (or alternated with) the conventional proppant 124), while sequentially increasing and decreasing the pumping rate to perform multiple pressure cycles. For example, the pressure cycles may be performed with a time frame of around 1 minute to around 1 hour per pressure cycle, although the time frame for each pressure cycle will vary depending on the details of the particular implementation. Moreover, during each pressure cycle, the pumping rate may be rapidly varied between a maximum pumping rate of around 40 barrels per minute (bpm) to around 50 bpm and a minimum pumping rate of around 90 bpm to around 100 bpm, although the range of pumping rates will also vary depending on the details of the particular implementation.

The pressure cycles may be performed by rapidly shutting off a fracturing pump (not shown) located at the wellhead 106 and then turning the fracturing pump back on. Additionally or alternatively, the pressure cycles may be performed by rapidly increasing and/or decreasing the operating pressure of the fracturing pump. Those skilled in the art will appreciate that the pressure cycles may also be performed in any other manner that will result in a suitable variation of the pumping rate during the variable rate fracturing process.

According to embodiments described herein, the utilization of the lightweight proppant 122 during the variable rate fracturing process provides for the creation of large, complex fractures 118 within each stage of the wellbore 102. This is due, at least in part, to the fact that the lightweight proppant 122 remains suspended in the fracturing fluid for a relatively long period of time and, thus, is capable of being transported for relatively long distances within the subsurface region 104. This, in turn, enables less settling during the low rate cycle of the variable rate pumping and, consequently, better proppant placement within the resulting fractures 118. Overall, the present techniques will result in an increase in the production rate for the hydrocarbon well 100, as well as a decrease in the number of wellbore cleanout and/or restimulation operations that must be performed.

The schematic view of FIG. 1 is not intended to indicate that the hydrocarbon well 100 is to include all of the components shown in FIG. 1, or that the hydrocarbon well 100 is limited to only the components shown in FIG. 1. Rather, any number of components may be omitted from the hydrocarbon well 100 or added to the hydrocarbon well 100, depending on the details of the specific implementation. Moreover, those skilled in the art will appreciate that, while the hydrocarbon well 100 is depicted as including only three zones, with one perforation and one corresponding fracture per zone, this is for ease of illustration only. In practice, the hydrocarbon well 100 may include, for example, around 20 to 100 individual zones (or stages), with each stage including around 3 to 20 perforation clusters, where each perforation cluster typically includes a series of around 12 to 18 perforations extending over a 1-foot to 3-foot region, and where each zone is typically separated by around 10 to 100 feet along the length of the wellbore 102. Furthermore, those skilled in the art will appreciate that, while the hydrocarbon well 100 is depicted as including a vertical section and a horizontal section, the hydrocarbon well 100 may include any number of additional or alternative lateral, deviated, and/or highly-deviated sections extending in various directions throughout the subsurface region 104. In addition, in some embodiments, the wellhead 106 is a splitter-type wellhead that connects to a number of hydrocarbon wells 100 within the subsurface region 104.

Exemplary Properties of Lightweight Proppant

The present techniques provide for the utilization of a low-cost, lightweight (or low-density) proppant, either alone or in combination with another, more conventional proppant, to increase the efficiency of a variable rate fracturing process. Specifically, utilizing a proppant that is much lighter than the industry standard enables the proppant to stay suspended during the pressure cycles that are induced as the pumping rate is varied throughout the variable rate fracturing process. Typically, when a proppant is pumped rapidly, the kinetic energy of the moving fluid in the turbulent flow enables the proppant to stay mostly suspended (or to settle at a relatively slow rate). However, when the pumping rate is decreased markedly (or stopped altogether), the proppant begins to settle at a much faster rate. Moreover, because the settling rate (e.g., the settling velocity, as shown in expressions for both Stokes terminal settling velocity and Ferguson & Church settling velocity) of the proppant is proportional to the difference in density between the proppant and the carrier fluid, utilizing a lighter-weight (i.e., lower-density) proppant according to embodiments described herein enables the proppant to stay suspended for a longer period of time during the variable rate fracturing process, thus increasing the overall fracturing potential for the process and extending the effective reach and/or depth for depositing the proppant within the resulting fractures. This concept is illustrated by equation (1), which may be used to determine the rate of settling (or settling velocity), v, for a proppant particle.

$$v = \frac{\rho_p - \rho_f}{18\eta} g\sigma^2, \tag{1}$$

In equation (1), $\rho_p - \rho_f$ is proportional to the density difference between the proppant particle and the carrier fluid; $\eta$ is the viscosity of the carrier fluid; g is the gravitational constant; and $\sigma^2$ is proportional to the square of the proppant particle size. As will be appreciated, proppant particles having lower apparent densities and/or smaller average particle sizes settle at a slower rate within an identical carrier fluid compared to particles with higher apparent densities and/or larger average particle sizes and, accordingly, also have better transport characteristics within such carrier fluid.

Proppant particle efficacy is further related to fracture conductivity, characterized by the fluid flow rate in a propped fracture under gradient pressure, the fracture being propped by a proppant pack. Fracture conductivity, $C_f$, is the product of the proppant pack permeability, k, and its thickness, h, and may be determined using equations (2) and (3).

$$C_f = kh \tag{2}$$

$$k = \frac{1}{C} \frac{\phi^3}{(1-\phi)^2} \sigma_{\mathit{eff}}^2 \Phi_s^2, \tag{3}$$

In equations (2) and (3), C is a constant; $\phi$ is the proppant pack void fraction; $\sigma$ is the average particle size diameter of the proppant particles; and $\Phi$ is a shape factor related to the sphericity of the proppant particles. In tension with settling rate and transport, fracture conductivity favors proppant particles having larger average particle size diameters, as well as thick proppant packs and narrow particle size distribution.

According to the present techniques, polyolefins, petroleum coke materials, and polyaromatic hydrocarbon resins were analyzed based on the aforementioned properties to determine their suitability for use as proppants. It was determined that polyolefins, petroleum coke materials, and polyaromatic hydrocarbon resins (either alone or in some combination) exhibit a number of characteristics that render them, not only a viable alternative for conventional, sand-based proppants, but further a surprising substitute with enhanced functionality, particularly when utilized to assist a variable rate fracturing process. Moreover, those skilled in the art will appreciate that the functionality of a lightweight proppant including polyolefins, petroleum coke, and/or polyaromatic hydrocarbon resins may be optimized when used in combination with one or more conventional proppants (and/or any other suitable type(s) of proppants). For example, the lightweight proppant described herein may make up around one fourth to around one half (e.g., in some embodiments, around one third) by volume of the total proppant pumped into a formation during variable rate fracturing process, with one or more conventional proppants (and/or any other suitable type(s) of proppants) making up the remaining volume of proppant.

Turning now to exemplary details regarding the composition of the lightweight proppant described herein, such lightweight proppant may include, for example, one or more polyolefins, one or more petroleum coke materials, one or more polyolefin-coke composite materials, one or more polymer-coated polyolefins, one or more polyaromatic hydrocarbon resins, one or more polymer-coated petroleum coke materials, one or more polymer-coated polyolefin-coke composite materials, one or more polymer-coated polyaromatic hydrocarbon resins, or any combinations thereof. For embodiments in which polyolefin(s) and/or polyolefin-coke composite material(s) are utilized, at least some proportion of the granules of the lightweight proppant may include and/or contain a number of polyolefin polymer chains, such as, for example, PP, PE (e.g., HDPE), a blend of PP and PE, PE wax, or any combination thereof. For embodiments in which petroleum coke material(s) and/or polyolefin-coke composite material(s) are utilized, at least some proportion of the granules of the lightweight proppant may include and/or contain fluid coke, flexicoke, pulverized delayed coke, or any combinations thereof. In addition, for embodiments in which polyaromatic hydrocarbon resin(s) are utilized, at least some proportion of the granules of the lightweight proppant may include and/or contain a substantially-spherical crosslinked reaction product of one or more polyaromatic hydrocarbons and a crosslinking agent including two or more functional groups that are reactive under acid-catalyzed conditions with aromatic rings of the polyaromatic hydrocarbon(s). Moreover, for embodiments in which the granules of the lightweight proppant are coated with one or more polymers (or resins), such polymer(s) may include, for example, epoxy, methacrylate, polyester, vinyl ester, furan, furfural, alcohol-furfural, polyurethane, urea-aldehyde, phenol-aldehyde, or any combinations thereof. In general, the specific formulation of the granules within the lightweight proppant may be specifically selected based on the particular subsurface conditions and fluid parameters.

With regard to the utilization of petroleum coke within the lightweight proppant described herein, petroleum coke is conventionally used as a fuel source in various manufacturing processes for heat. However, coke is a low-BTU fuel source. Therefore, by using coke as a proppant rather than as a fuel source, $CO_2$ emissions may be reduced as a result of higher-BTU fuel sources replacing the coke as a fuel source. In effect, using coke as a proppant is a form of sequestering carbon that would otherwise contribute to $CO_2$ emissions. Moreover, the costs associated with hydraulic fracturing may also be reduced, at least in part because large volumes of coke are readily available from already-existent petroleum refinery process streams and are typically cost-competitive to sand. As described herein, coke also has sufficient crush strength to maintain propped fractures upon the removal of hydraulic pressure and to maintain efficient conductivity once the wellbore is brought on production. In addition, the relatively low density of coke may decrease or eliminate the need to use gelled fracturing fluids, thereby avoiding the costs associated with gelation. Furthermore, using coke may potentially reduce required pumping pressures, reduce overall water consumption, and avoid the need for frequent wellbore cleanout operations.

In various embodiments, any suitable type(s) of petroleum coke may be used within the lightweight proppant. For example, in various embodiments, the granules of the lightweight proppant described herein include flexicoke material, alone or in combination with one or more other types of coke material. Flexicoke is a type of petroleum coke that is produced via the FLEXICOKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically about 496° C. to about 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

Flexicoke may have a carbon content of about 85 wt % to about 99 wt %; a weight ratio of carbon to hydrogen of about 80:1 to about 95:1; and an impurities content (i.e., a weight percent of all components other than carbon and hydrogen) of about 1 wt % to about 10 wt %. Flexicoke also has a higher metal content than other cokes. In particular, flexicoke may have a combined vanadium and nickel content of about 3,000 ppm to about 45,000 ppm. In addition, flexicoke may have a sulfur content of 0 wt % to about 5 wt %, as well as a nitrogen content of 0 wt % to about 3 wt %.

The apparent density of flexicoke may be in the range of about 1.0 g/cc to about 2.0 g/cc. Traditional sand-based proppants generally have apparent densities greater than about 2.5 g/cc. Thus, the flexicoke material included within the lightweight proppant described herein has substantially lesser apparent densities compared to conventional, sand-based proppants, which is indicative of its comparably more effective transport and lower settling rates within a fracture formed as part of a hydraulic fracturing operation.

As another example, in various embodiments, the granules of the lightweight proppant described herein include fluid coke material, alone or in combination with one or more other types of coke material. Such fluid coke material is obtained via a fluid coking process. Generally-speaking, flexicoke is considered to be a type (or subset) of fluid coke. Therefore, as expected, fluid coke material includes a number of the same (or similar) characteristics as flexicoke material. However, the fluid coking process may be manipulated in various ways to produce fluid coke having a number of distinctive characteristics. For example, fluid coke may have a carbon content of about 75 wt % to about 93 wt %; a weight ratio of carbon to hydrogen of about 30:1 to about 50:1; and an impurities content of about 5 wt % to about 25 wt %. Fluid coke may also have a sulfur content of about 3 wt % to about 10 wt %, as well as a nitrogen content of about 0.5 wt % to about 3 wt %. In addition, the apparent density of fluid coke may be in the range of about 1.4 g/cc to about 2.0 g/cc.

Furthermore, as another example, in some embodiments, the granules of the lightweight proppant described herein include delayed coke material, alone or in combination with one or more other types of coke material. Delayed coke is a type of coke that is produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature of around 480° C. to around 515° C. The heated feedstock then enters a reactor, referred to as a "coke drum," which typically operates at temperatures of around 415° C. to around 450° C. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

Delayed coke may exhibit the following properties: (1) a carbon content of about 82 wt % to about 90 wt %; (2) a weight ratio of carbon to hydrogen of about 15:1 to about 30:1; (3) a combined vanadium and nickel content of about 100 ppm to about 3,000 ppm; (4) a sulfur content of 2 wt % to about 8 wt %; and/or (5) a nitrogen content of 1 wt % to about 2 wt %, where such properties are measured on a dry, ash-free basis (or, in other words, not counting residual ash content and removing moisture before the analysis). In addition, delayed coke may have a moisture content of around 6 wt % to around 14 wt % and a volatile matter content of around 6 wt % to around 18 wt %, as measured on an as-received basis. Moreover, the apparent density of delayed coke may be in the range of about 1.0 g/cc to about 1.7 g/cc. Furthermore, the crush strength of delayed coke is comparable to the crush strengths of other types of coke granules.

Notably, however, if delayed coke is used, alone or in combination with other types of coke material, some amount of preprocessing is required to pulverize (or grind) the delayed coke to a suitable particle size. Therefore, while delayed coke is available in significantly larger quantities than fluid coke or flexicoke, it may be preferable to use flexicoke and/or fluid coke within the lightweight proppant described herein.

With regard to the utilization of polyolefins within the lightweight proppant described herein, polyolefins have relatively-low densities that render them particularly suitable for hydraulic fracturing applications. For example, polyethylene (PE) wax has a density of around 0.92 to around 0.94 g/cc, highly-crosslinked PEs (e.g., HDPE) have a density of around 0.92 to around 0.96 g/cc, and polypropylene (PP) has a density of around 0.92 to around 0.96 g/cc. Moreover, polyolefins can be compounded with fillers (e.g., PE/PP compounds with carbon black) to increase their compressive strength to a suitable level for hydraulic fracturing operations.

The lightweight proppant described herein may also include any suitable type(s) of polyolefin polymer chains. Such polyolefin polymer chains may include, for example, polypropylene polymer chains, polyethylene polymer chains (including, for example, highly-crosslinked polyethylene polymer chains such as HDPE), and/or PE wax. In some embodiments, multiple different types of polyolefin polymer chains may also be combined according to embodiments described herein. For example, HDPE/PP blends and/or PE/PP blends may be used.

With respect to the use of PE wax within the lightweight proppant described herein, the backbone of PE wax is generally C20-C40, and it may be as high as C30-C60 if the PE wax includes some naphthenic content. Moreover, while PE and PE wax share the same backbone chemistry, they differ by molecular weight and, thus, have different physical properties (e.g., different densities and mechanical strengths). In various embodiments, the encapsulation of coke granules within PE wax may provide granules of the lightweight proppant with preferred proppant transport properties due to the relatively-low corresponding composite density.

In some embodiments, crosslinked (or highly-crosslinked) polyolefin polymer chains may be used within the lightweight proppant described herein. The polyolefin polymer chains may be crosslinked via a number of chemical crosslinks that covalently bond the polyethylene polymer chains to each other. Taking crosslinked polyethylene as an example, crosslinked polyethylene is lightweight, thermally- and chemically-stable, and mechanically strong (e.g. at temperature of 85° C., and under a uniaxial stress of 35 Megapascals, it does not deform more than 10% after 8 weeks of exposure to a typical crude). Moreover, pellets of crosslinked polyethylene can be pulverized into smaller beads that are suitable for use within the lightweight proppant described herein.

For embodiments in which polyolefin-coke composite material is included within the lightweight proppant described herein, any suitable type(s) of petroleum coke granules (as described above) and any suitable type(s) of polyolefin polymer chains (as described above) may be combined in any suitable proportions to form the polyolefin-coke composite material. For example, in various embodiments, the polyolefin-coke composite material includes at least 40 wt % and at most 90 wt % of the polyolefin polymer chains and at least 10 wt % and at most 60 wt % of the petroleum coke. As a more specific example, polyolefin-coke composite material including about 10 wt % to about 15 wt % petroleum coke combined with about 85 wt % to about 90 wt % polyolefin polymer chains may exhibit a density that is close to water, while the polyolefin-coke composite material including about 60 wt % petroleum coke combined with about 40 wt % polyolefin polymer chains may exhibit a density within the range of about 1.2 g/cc to about 1.3 g/cc.

With regard to the utilization of polyaromatic hydrocarbon resins within the lightweight proppant described herein, suitable polyaromatic hydrocarbon resins can be obtained from various refinery process streams (e.g., oftentimes waste streams) that otherwise have low intrinsic value. Such refinery process streams may include, for example, steam cracker tar, main column bottoms (also referred to as FCC main column bottoms or slurry oil), vacuum residue, C5 rock, C3-C5 rock, asphaltenes, bitumen, K-pot bottoms, and/or lube extracts. Moreover, in various embodiments, such low-value streams including polyaromatic hydrocarbons can be used to form crosslinked polyaromatic-hydrocarbon reaction products that are suitable for use within the lightweight proppant described herein. In such embodiments, the granules of the lightweight proppant may be formed by reacting a polyaromatic hydrocarbon with a crosslinking agent that includes two or more reactive functional groups. The reactive functional groups convey bifunctional reactivity upon a linker bridging one polyaromatic hydrocarbon molecule to one or more other polyaromatic hydrocarbon molecules, where the crosslinking chemistries are acid-catalyzed and are believed to proceed through a carbocation intermediate in an electrophilic aromatic substitution reaction. A variety of acid catalysts may be employed for this purpose. Moreover, in such embodiments, the resulting reaction product is formed as substantially-spherical granules, which may be used as at least a portion of the lightweight proppant described herein.

In some embodiments, the resulting substantially-spherical, polyaromatic-hydrocarbon-resin-based granules include an aromatic content of about 80% or above, with a ratio of carbon to hydrocarbon of about 1.4:1 or lower. In various embodiments, the granules have particles sizes ranging from about 10 µm to about 3 mm or, more preferably, from about 100 µm to about 1 mm. In addition, in various embodiments, the granules have densities ranging from about 0.8 g/cc to about 1.5 g/cc. Such granules may also exhibit relatively-high crush strength properties, with substantially no fines forming at stress levels up to about 5,000 psi, for example.

Polyaromatic hydrocarbon resins suitable for forming such granules may be obtained from any source and have any molecular structure, provided that the molecular structure is capable of forming substantially-spherical granules following crosslinking. The polyaromatic hydrocarbon resins may include only carbon and hydrogen, or the polyaromatic hydrocarbon resins may additionally include heteroatoms, such as, for example, nitrogen or sulfur, which may replace one or more ring carbon atoms defining a portion of the polyaromatic hydrocarbons. Furthermore, the resulting granules may optionally include one or more additives that alter the properties of the resulting granules. Such additives may include, for example, plasticizers, polymers, oils, and/or fillers.

As described herein, any (or all) of the granules within the lightweight proppant described herein may optionally be coated. Specific examples of coatings that may be used include polymers, such as, epoxy, methacrylate, polyester, vinyl ester, furan, furfural, alcohol-furfural, polyurethane, urea-aldehyde, phenol-aldehyde, or any combinations thereof. Moreover, such coatings may be introduced at any stage of the variable rate fracturing process, with the resulting proppant composition being either a mixture of coated and uncoated proppant granules or entirely coated proppant granules.

Furthermore, in various embodiments, the characteristic dimension (e.g., particle size or diameter) of each granule of the lightweight proppant described herein is at least partially dependent on the type(s) of polyolefin(s), petroleum coke material(s), and/or polyaromatic hydrocarbon resin(s) utilized within such granules. In particular, while the characteristic dimension of each granule may be within the range of about 10 µm and to about 3 mm, the actual characteristic dimension of each granule may be modified and adapted to each particular implementation. As an example, in some embodiments, the granules are formed such that the characteristic dimension of each granule roughly correlates to the characteristic dimension of conventional proppants, such as sand, which typically range from about 100 µm to about 600 µm. Alternatively, in other embodiments, the granules are formed such that the characteristic dimension of each granule is smaller than (or, in some cases, larger than) the characteristic dimension of conventional proppants.

Those skilled in the art will appreciate that the properties and characteristics of the lightweight proppant described herein will vary based on the particular combination of petroleum coke material, polyolefin polymer chains, and/or polyaromatic hydrocarbon resins utilized to form the granules of the lightweight proppant. In some embodiments, this variability may be utilized to customize the lightweight proppant based on the details of the specific implementation.

According to embodiments described herein, utilizing a lightweight (or low-density) proppant with some combination of the characteristics described above may decrease the proppant setting rate by about 40% to about 55% as compared to the settling rate of conventional, higher-density proppants. This, in turn, increases the feasibility and efficiency of applying variable rate fracturing techniques during hydraulic fracturing operations. In particular, conventional, higher-density proppants are prone to causing screen out conditions, in which the settled proppant granules restrict fluid flow into the fractures. In many cases, the application of variable rate fracturing techniques under such conditions would require wide fluctuations in pumping rates and pressures that exceed the safe limitations of the wellbore and/or the associated wellhead equipment. However, because the lightweight proppant described herein is less prone to settling and, thus, less likely to cause screen out and other negative conditions, variable rate fracturing techniques may be effectively utilized to increase the numbers, sizes, and/or complexities of the fractures within the stages of a hydrocarbon well.

Figure 2:
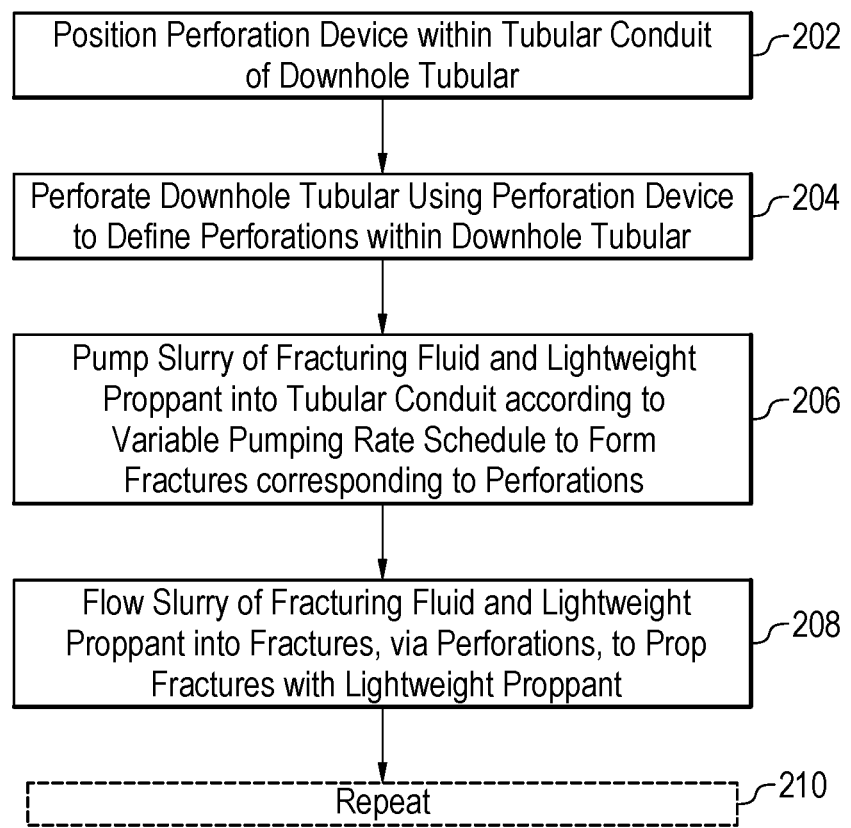
FIG. 2 is a process flow diagram of an exemplary method for completing a hydrocarbon well using variable rate fracturing techniques according to embodiments described herein.

Exemplary Method for Completing Hydrocarbon Well Using Variable Rate Fracturing Techniques FIG. 2 is a process flow diagram of an exemplary method 200 for completing a hydrocarbon well (such as the exemplary hydrocarbon well 100 described with respect to FIG. 1) using variable rate fracturing techniques according to embodiments described herein. The method 200 begins at block 202, at which a perforation device is positioned within a tubular conduit of a downhole tubular, where the downhole tubular extends within a wellbore of the hydrocarbon well, and where the wellbore extends within a subsurface region. This may be performed in any suitable manner. As an example, the perforation device may be flowed in a downhole direction and/or within a conveyance fluid stream that may be provided to the tubular conduit. As another example, an umbilical may be utilized to position the perforation device within the tubular conduit and/or to retain the perforation device within a target (or desired) region of the tubular conduit. As another example, the umbilical may be utilized to pull the perforation device in an uphole direction to position the perforation device within the tubular conduit and/or within the target region of the tubular conduit. Examples of a suitable umbilical for this purpose include a slickline, a wireline, coiled tubing, and/or a workover string.

At block 204, the downhole tubular is perforated using the perforation device to define (or create) perforations within the downhole tubular. This may be accomplished in any suitable manner. As an example, the perforation device may include and/or be a shaped charge perforation device that includes shaped charges. In this example, the downhole tubular may be perforated by igniting and/or discharging at least a subset of the shaped charges to form and/or define the perforations within the downhole tubular.

At block 206, a slurry including fracturing fluid and lightweight proppant (and, optionally, some amount of conventional proppant) is pumped into the tubular conduit according to a variable pumping rate schedule, as described herein with reference to a variable rate fracturing process, to fracture a number of zones of the subsurface region that are proximate to the perforations, forming a number of corresponding fractures within the subsurface region. In various embodiments, this includes flowing the slurry into the tubular conduit while sequentially increasing and decreasing the pumping rate, thus inducing a number of pressure cycles within the wellbore. Such pressure cycles, in turn, help to force the slurry into the subsurface region via the perforations, locally pressurizing the subsurface region such that the fractures are formed within the subsurface region. Moreover, in some embodiments, block 206 includes alternating between pumping only the fracturing fluid and pumping the slurry including the fracturing fluid and the lightweight proppant into the tubular conduit according to the variable pumping rate schedule to fracture the zones of the subsurface region that are proximate to the perforations.

At block 208, the slurry including the fracturing fluid and the lightweight proppant (and, optionally, the conventional proppant) is flowed into at least a portion of the fractures, via the perforations, to prop the fractures with the lightweight proppant (and, optionally, the conventional proppant). In some embodiments, this includes flowing a slurry including only the fracturing fluid and the lightweight proppant into a first portion of the fractures and flowing a slurry including the fracturing fluid and a conventional proppant into a second portion of the fractures. For example, in such embodiments, a slurry including the conventional proppant may be initially flowed into the fractures. At some point, the initial flow may be stopped, and the lightweight proppant may then be flowed into the fractures. In some cases, such a configuration may permit and/or facilitate stratification, layering, and/or segregation of the conventional proppant and the lightweight proppant within the fracture and may, under certain conditions, produce and/or generate improved and/or increased propping of and/or fluid permeability within the fractures. Furthermore, as a more specific example, the conventional proppant, which may be less expensive and/or more readily available relative to the lightweight proppant, may be flowed into fractures associated with deeper zones of the subsurface region, while the lightweight proppant, which may more readily remain in suspension within the fracturing fluid relative to the conventional proppant, may be flowed into upper zones of the subsurface region. Such a configuration, combined with variable rate pumping, may permit and/or facilitate performing completion operations within a given hydrocarbon well utilizing relatively lower overall, or average, flow rates of the fracturing fluid and/or may permit and/or facilitate propping of zones of the subsurface region that are farther downhole than otherwise would be feasible utilizing solely conventional proppant.

According to the method 200, the lightweight proppant includes a number of granules, where each granule includes one or more polyolefins, one or more petroleum coke materials, and/or one or more polyaromatic hydrocarbon resins. In some embodiments, the one or more polyolefin includes polypropylene (PP), polyethylene (PE), a blend of PP and PE, and/or PE wax. In some embodiments, the one or more petroleum coke materials includes flexicoke, fluid coke, and/or pulverized delayed coke. In some embodiments, the one or more polyaromatic hydrocarbon resins include a substantially-spherical crosslinked reaction product of one or more polyaromatic hydrocarbons and a crosslinking agent including two or more functional groups that are reactive under acid-catalyzed conditions with aromatic rings of the polyaromatic hydrocarbon(s). In some embodiments, the granules of the lightweight proppant include a polyolefin-coke composite material. In such embodiments, each granule may include at least 40 weight percent (wt %) and at most 90 wt % polyolefin and at least 10 wt % and at most 60 wt % petroleum coke.

In addition, according to the method 200, a characteristic dimension of each granule of the lightweight proppant is at least 10 μm and at most 3 mm. Furthermore, in various embodiments, the lightweight proppant has a density of between 0.8 g/cc and 1.6 g/cc.

In various embodiments, the method 200 includes formulating the lightweight proppant and controlling the variable pumping rate schedule such that settling of the lightweight proppant within a near-perforation region of each fracture is minimized. Additionally or alternatively, in various embodiments, the method 200 includes coating at least a portion of the granules of the lightweight proppant with a polymer. In such embodiments, the polymer may include epoxy, methacrylate, polyester, vinyl ester, furan, furfural, alcohol-furfural, polyurethane, urea-aldehyde, and/or phenol-aldehyde. Additionally or alternatively, in various embodiments, the method 200 includes formulating the granules of the lightweight proppant based on conditions within the subsurface region and parameters corresponding to pumping the slurry including the fracturing fluid and the lightweight proppant into the tubular conduit.

At optional block 210, at least the portion of block 202-208 of the method 200 may be repeated. This may include repeating any suitable blocks in any suitable manner and/or in any suitable order. As an example, this may include repeating the positioning at block 202, the perforating at block 204, the pumping at block 206, and the flowing at block 208 to fracture and prop a number spaced-apart zones (or stages) of the subsurface region, as illustrated schematically in FIG. 1.

The process flow diagram of FIG. 2 is not intended to indicate that the steps of the method 200 are to be executed in any particular order, or that all of the steps of the method 200 are to be included in every case. Further, any number of additional steps not shown in FIG. 2 may be included within the method 200, depending on the details of the specific implementation.

Exemplary Embodiments of Present Techniques

In one or more embodiments, the present techniques may be susceptible to various modifications and alternative forms, such as the following embodiments as noted in paragraphs 1 to 20:

1. A method of completing a hydrocarbon well using variable rate fracturing, the method comprising: positioning a perforation device within a tubular conduit of a downhole tubular, wherein the downhole tubular extends within a wellbore, and wherein the wellbore extends within a subsurface region; perforating the downhole tubular using the perforation device to define a plurality of perforations within the downhole tubular; pumping a slurry comprising a fracturing fluid and a lightweight proppant into the tubular conduit according to a variable pumping rate schedule to fracture a plurality of zones of the subsurface region that are proximate to the plurality of perforations, forming a plurality of corresponding fractures within the subsurface region; and flowing the slurry comprising the fracturing fluid and the lightweight proppant into at least a portion of the plurality of fractures, via the perforations, to prop the fractures with the lightweight proppant; wherein the lightweight proppant comprises a plurality of granules comprising at least one of a polyolefin, petroleum coke, or a polyaromatic hydrocarbon resin; and wherein a characteristic dimension of each granule is at least 10 micrometers and at most 3 millimeters.

2. The method of paragraph 1, further comprising formulating the lightweight proppant and controlling the variable pumping rate schedule such that settling of the lightweight proppant within a near-perforation region of each fracture is minimized.

3. The method of paragraph 1 or 2, wherein the slurry further comprises a conventional proppant.

4. The method of any of paragraphs 1 to 3, comprising alternating between pumping only the fracturing fluid and pumping the slurry comprising the fracturing fluid and the lightweight proppant into the tubular conduit according to the variable pumping rate schedule to fracture the plurality of zones of the subsurface region that are proximate to the plurality of perforations.

5. The method of any of paragraphs 1 to 4, further comprising flowing a slurry comprising the fracturing fluid and a conventional proppant into at least a portion of the plurality of fractures, via the perforations, to prop the fractures with the conventional proppant.

6. The method of any of paragraphs 1 to 5, wherein the polyolefin comprises at least one of polypropylene (PP), polyethylene (PE), a blend of PP and PE, or PE wax.

7. The method of any of paragraphs 1 to 6, wherein the petroleum coke comprises at least one of flexicoke, fluid coke, or pulverized delayed coke.

8. The method of any of paragraphs 1 to 7, comprising forming the granules of the lightweight proppant from a polyolefin-coke composite material.

9. The method of paragraph 8, comprising forming the granules of the lightweight proppant from the polyolefin-coke composite material such that each granule comprises at least 40 weight percent (wt %) and at most 90 wt % polyolefin and at least 10 wt % and at most 60 wt % petroleum coke.

10. The method of any of paragraphs 1 to 9, comprising coating at least a portion of the granules of the lightweight proppant with a polymer.

11. The method of paragraph 10, wherein the polymer comprises at least one of epoxy, methacrylate, polyester, vinyl ester, furan, furfural, alcohol-furfural, polyurethane, urea-aldehyde, or phenol-aldehyde.

12. The method of any of paragraphs 1 to 11, wherein pumping the slurry comprising the fracturing fluid and the lightweight proppant into the tubular conduit according to the variable pumping rate schedule comprises sequentially increasing and decreasing a pumping rate for pumping the slurry comprising the fracturing fluid and the lightweight proppant into the tubular conduit such that a plurality of pressure cycles are induced within the tubular conduit.

13. The method of any of paragraphs 1 to 12, comprising formulating the granules of the lightweight proppant based on conditions within the subsurface region and parameters corresponding to pumping the slurry comprising the fracturing fluid and the lightweight proppant into the tubular conduit.

14. The method of any of paragraphs 1 to 13, comprising performing the method for each of a plurality of stages of the wellbore.

15. The method of any of paragraphs 1 to 14, comprising providing the lightweight proppant with a density of between 0.8 grams per cubic centimeter (g/cc) and 1.6 g/cc.

16. A method of completing a hydrocarbon well using variable rate fracturing, the method comprising hydraulically fracturing a subsurface region through which a wellbore extends by sequentially increasing and decreasing a pumping rate for pumping a slurry comprising a fracturing fluid and a lightweight proppant into the subsurface region via a tubular conduit of the wellbore; wherein the sequential increase and decrease of the pumping rate and a formulation of the lightweight proppant are controlled such that settling of the lightweight proppant within a near-wellbore region of the subsurface region is minimized; and wherein the lightweight proppant comprises a plurality of granules comprising at least one of a polyolefin, petroleum coke, or a polyaromatic hydrocarbon resin.

17. The method of paragraph 16, wherein the slurry further comprises a conventional proppant.

18. The method of paragraph 16 or 17, comprising forming the granules of the lightweight proppant from a polyolefin-coke composite material.

19. The method of any of paragraphs 16 to 18, comprising coating at least a portion of the granules of the lightweight proppant with a polymer.

20. The method of any of paragraphs 16 to 19, comprising providing the lightweight proppant with a density of between 0.8 grams per cubic centimeter (g/cc) to 1.6 g/cc.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method of completing a hydrocarbon well using variable rate fracturing, the method comprising:
positioning a perforation device within a tubular conduit of a downhole tubular, wherein the downhole tubular extends within a wellbore, and wherein the wellbore extends within a subsurface region;
perforating the downhole tubular using the perforation device to define a plurality of perforations within the downhole tubular;
pumping a slurry comprising a fracturing fluid and a lightweight proppant into the tubular conduit according to a variable pumping rate schedule to fracture a plurality of zones of the subsurface region that are proximate to the plurality of perforations, forming a plurality of corresponding fractures within the subsurface region; and
flowing the slurry comprising the fracturing fluid and the lightweight proppant into at least a portion of the plurality of fractures, via the perforations, to prop the fractures with the lightweight proppant; wherein the lightweight proppant comprises a plurality of granules comprising petroleum coke, wherein the petroleum coke comprises at least one of flexicoke, fluid coke, or pulverized delayed coke; and wherein a characteristic dimension of the plurality of granules is at least 10 micrometers and at most 3 millimeters, the lightweight proppant staying suspended during the variable rate fracturing.

2. The method of claim 1, further comprising formulating the lightweight proppant and controlling the variable pumping rate schedule such that settling of the lightweight proppant within a near-perforation region of each fracture is minimized.

3. The method of claim 1, wherein the slurry further comprises a conventional proppant.

4. The method of claim 1, comprising alternating between pumping only the fracturing fluid and pumping the slurry comprising the fracturing fluid and the lightweight proppant into the tubular conduit according to the variable pumping rate schedule to fracture the plurality of zones of the subsurface region that are proximate to the plurality of perforations.

5. The method of claim 1, further comprising flowing a slurry comprising the fracturing fluid and a conventional proppant into at least a portion of the plurality of fractures, via the perforations, to prop the fractures with the conventional proppant.

6. The method of claim 1, wherein the plurality of granules comprises a polyolefin that comprises at least one of polypropylene (PP), polyethylene (PE), a blend of PP and PE, or PE wax.

7. The method of claim 1, comprising forming the granules of the lightweight proppant from a polyolefin-coke composite material.

8. The method of claim 7, comprising forming the granules of the lightweight proppant from the polyolefin-coke composite material such that the plurality of granules comprise at least 40 weight percent (wt %) and at most 90 wt % polyolefin and at least 10 wt % and at most 60 wt % petroleum coke.

9. The method of claim 1, comprising coating at least a portion of the granules of the lightweight proppant with a polymer.

10. The method of claim 9, wherein the polymer comprises at least one of epoxy, methacrylate, polyester, vinyl ester, furan, furfural, alcohol-furfural, polyurethane, urea-aldehyde, or phenol-aldehyde.

11. The method of claim 1, wherein pumping the slurry comprising the fracturing fluid and the lightweight proppant into the tubular conduit according to the variable pumping rate schedule comprises sequentially increasing and decreasing a pumping rate for pumping the slurry comprising the fracturing fluid and the lightweight proppant into the tubular conduit such that a plurality of pressure cycles are induced within the tubular conduit.

12. The method of claim 1, comprising formulating the granules of the lightweight proppant based on conditions within the subsurface region and parameters corresponding to pumping the slurry comprising the fracturing fluid and the lightweight proppant into the tubular conduit.

13. The method of claim 1, comprising performing the method for each of a plurality of stages of the wellbore.

14. The method of claim 1, comprising providing the lightweight proppant with a density of between 0.8 grams per cubic centimeter (g/cc) and 1.6 g/cc.

15. A method of completing a hydrocarbon well using variable rate fracturing, the method comprising hydraulically fracturing a subsurface region through which a wellbore extends by sequentially increasing and decreasing a pumping rate for pumping a slurry comprising a fracturing fluid and a lightweight proppant into the subsurface region via a tubular conduit of the wellbore; wherein the sequential increase and decrease of the pumping rate and a formulation of the lightweight proppant are controlled such that the lightweight proppant stays suspended during the variable rate fracturing and settling of the lightweight proppant within a near-wellbore region of the subsurface region is minimized; and wherein the lightweight proppant comprises a plurality of granules comprising petroleum coke, wherein the petroleum coke comprises at least one of flexicoke, fluid coke, or pulverized delayed coke.

16. The method of claim 15, wherein the slurry further comprises a conventional proppant.

17. The method of claim 15, comprising forming the granules of the lightweight proppant from a polyolefin-coke composite material.

18. The method of claim 15, comprising coating at least a portion of the granules of the lightweight proppant with a polymer.

19. The method of claim 15, comprising providing the lightweight proppant with a density of between 0.8 grams per cubic centimeter (g/cc) to 1.6 g/cc.

* * * * *